United States Patent
Hayashi et al.

(10) Patent No.: US 6,780,513 B2
(45) Date of Patent: Aug. 24, 2004

(54) MAGNETIC RECORDING MEDIUM

(75) Inventors: Takahiro Hayashi, Tokyo (JP); Kunihiro Ueda, Tokyo (JP); Kenji Shirasuna, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/323,650

(22) Filed: Dec. 20, 2002

(65) Prior Publication Data

US 2003/0152811 A1 Aug. 14, 2003

(30) Foreign Application Priority Data

Dec. 20, 2001 (JP) ........................................ 2001-387945

(51) Int. Cl.$^7$ ................................................. G11B 5/71
(52) U.S. Cl. ................................ 428/421; 428/694 TP; 428/694 TF
(58) Field of Search ........................... 428/421, 694 TP, 428/694 TF, 694 TC

(56) References Cited

U.S. PATENT DOCUMENTS

| | | | |
|---|---|---|---|
| 4,849,305 A | * | 7/1989 | Yanagisawa ............... 428/695 |
| 6,187,724 B1 | | 2/2001 | Ikarashi et al. |

FOREIGN PATENT DOCUMENTS

| | | | |
|---|---|---|---|
| JP | 07-192255 | * | 7/1995 |

* cited by examiner

*Primary Examiner*—Stevan A. Resan
(74) *Attorney, Agent, or Firm*—Oblon, Spivak, McClelland, Maier & Neustadt, P.C.

(57) ABSTRACT

The present invention provides a metal thin film type magnetic recording medium having improved tracking stability and friction stability, by improving the lubricating layer in consideration of the state of forming the lubricating layer in view of the distribution of the lubricant.

The magnetic recording medium according to the present invention at least has, in turn, a metal magnetic layer, a protective layer and a lubricating layer on one surface of a nonmagnetic base. The covering ratio of a surface of the lubricating layer with the lubricant is 65–75%. The lubricating layer is produced by applying a mixture of solvents containing at least three solvents selected from three groups, that is from at least one from group (1): ketone solvents having a boiling point of 40–130° C., at least one from group (2): aliphatic hydrocarbon solvents having 4 carbons–10 carbons, and at least one from group (3) alcoholic solvents having equal or less than 6 carbons, the mixture ratio of these solvents of respective groups being preferably selected to be: (1) ketone solvents 5–20% wt.; (2) aliphatic hydrocarbon solvents 10–40% wt.; and (3) alcoholic solvents 40–80% wt.

7 Claims, 1 Drawing Sheet

MAGNETIC RECORDING MEDIUM

BACKGROUND OF THE INVENTION

1. Field of the Invention

The present invention relates to a magnetic recording medium, and more specifically a magnetic recording medium having a metal thin film type magnetic layer.

2. Description of the Related Art

Conventionally, magnetic recording mediums of the type in which magnetic layers are formed by application are generally widely employed. These mediums are generally manufactured by applying and drying magnetic materials that include: a binder material such as vinyl chloride-vinyl acetate copolymer, polyester resins and polyurethane resins; and a magnetic material and other additives dispersed into the binder material.

On the other hand, so called metal thin film type magnetic recording mediums are proposed, that are manufactured by forming films of ferromagnetic metal materials such as Co—Ni alloys and the like onto a film shaped base material such as polyethylene terephthalate (PET) and the like via vacuum thin film forming technology (such as vacuum deposition, sputtering, ion-plating and the like). Such metal thin film type magnetic recording mediums have been practically utilized, because of the following advantages: the metal thin film type magnetic recording mediums can be designed to have very thin in thickness as compared with the conventional applying type magnetic recording mediums; the metal thin film type magnetic recording mediums has better electromagnetic conversion characteristics at short wave due to its better magnetic retention, better squareness ratio and the like; packing density of the magnetic materials is higher due to the absence of the nonmagnetic material such as organic binders and the like in the magnetic layer, thereby improving storage density.

However, since the metal thin film type magnetic recording medium is formed by directly depositing magnetic metals onto the base, the metal thin film type magnetic recording medium has very smooth magnetic layer surface and has substantially larger contact surface area and since the magnetic metal itself does not provide lubricity, the friction coefficient of the surface may increase to adversely affect the tracking stability and the friction stability. Accordingly, a lubricating layer is proposed for reducing the surface friction coefficient of the metal thin film type magnetic recording medium to improve the tracking ability. The lubricating layer may be formed by applying a lubricant on the protective layer of hard carbon film and the like that is formed onto the surface of the magnetic layer.

As such, it is critical to monitor the condition for forming the lubricating layer, i.e., the condition after applying the lubricant, for the purpose of ensuring the tracking stability, friction stability and the like of the metal thin film type magnetic recording medium. In such cases, ESCA (Electron Spectroscopy for Chemical Analysis) is often employed for monitoring quantity of the lubricant applied on the magnetic layer. For example, in the case of organic lubricants containing fluorine atoms, the quantity of the applied lubricant can be monitored by monitoring a number counted from the ESCA data that are obtainable by performing ESCA measurements with the fluorine chemical shift after forming the lubricating layer.

However, ESCA does not provide the Information on the distribution of the lubricant, though ESCA successfully provides the quantitative conditions of the formed lubricant since ESCA provides the quantitative measurements, and therefore a research focusing on the distribution of the lubricant across the surface of the magnetic recording mediums at the time of forming the lubricating layer has not been achieved.

Consequently, an object of the invention is to provide an improved metal thin film type magnetic recording medium having improved tracking stability and improved friction stability by providing an improvement in the distribution of the lubricant contained across the surface of the lubricating layer.

SUMMARY OF THE INVENTION

The present inventors have found, as a result of various investigations carried out for the purpose of solving the problems indicated above, methods for readily measuring and controlling the distribution of the lubricant across the lubricating layer by using low cost equipments, and further the present inventors have found that the metal thin film type magnetic recording medium having improved tracking stability and improved friction stability by controlling the distribution of the lubricant across the lubricating layer with the present method to stabilizing the lubricant covering ratio onto the surface of the lubricating layer to an appropriate level, and thus the present invention is completed.

That is, a magnetic recording medium according to the present invention is the magnetic recording medium at least having, in turn, a metal magnetic layer, a protective layer and a lubricating layer on one surface of a nonmagnetic base, wherein the covering ratio of a surface of the lubricating layer with the lubricant is 65–75%.

According to one aspect of the present invention, it is preferable that the lubricating layer is formed by applying a mixture of solvents containing at least three solvents selected from three groups, that is from at least one from group (1): ketone solvents having a boiling point of 40–130° C., at least one from group (2): aliphatic hydrocarbon solvents having 4 carbons–10 carbons, and at least one from group (3) alcoholic solvents having equal or less than 6 carbons. More particularly, the mixture ratio of these solvents of respective groups is preferably selected to be: (1) ketone solvents 5–20% wt.; (2) aliphatic hydrocarbon solvents 10–40% wt.; and (3) alcoholic solvents 40–80% wt.

Further, the covering ratio can be preferably measured by using conductive atomic force microscope (AFM), and the protective layer preferably includes a compound having hard carbon film and the lubricating layer preferably includes a lubricant of a compound having fluorine atom.

DESCRIPTION OF THE PREFERRED EMBODIMENTS

Figure 1:
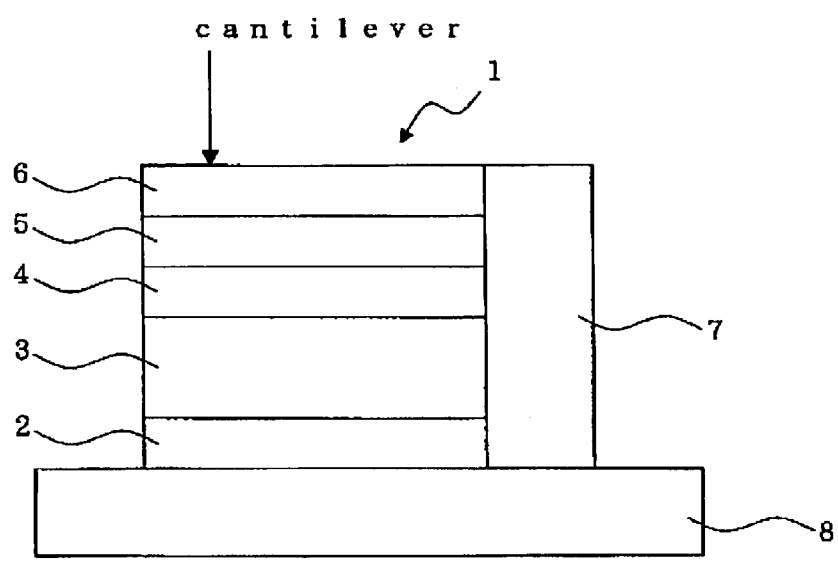
FIG. 1 shows a schematic diagram of the measurements using AFM.

The present invention will be fully described by referring specific embodiments.

A magnetic recording medium according to the present invention at least has, in turn, a metal magnetic layer, a protective layer and a lubricating layer on one surface of a nonmagnetic base.

The covering ratio of the lubricating layer according to the present invention, that is, the fraction of a lubricant covering the lubricating layer surface, is within a range of 65–75%. Adjusting the covering ratio within this range provides maintaining better tracking stability of the magnetic recording medium. On the contrary, the covering ratio of less than 65% provides worse tracking stability, since the covering ratio within this range promotes localization of sea island state thereof. On the other hand, the covering ratio of greater than 75% requires additional excessive application, and therefore the suitable range of the application cannot be applicable in the case of selecting the covering ratio within this range. The lubricants generally have a tendency of self agglomeration, and therefore if one wants to fully cover the surface with the lubricant, a considerable amount of the lubricant is necessary, and thus, taking these characteristics into account, the upper limit thereof is defined as 75%.

The covering ratio may be measured by using the atomic force microscope (AFM), and selecting the conductance mode. More specifically, a shape of a surface of a sample is measured by using the AFM and selecting a suitable in depth probe (such as platinum coated probe, Si probe, Co probe and the like), and simultaneously the electrical current between the probe and the sample is measured with an amplifier while applying DC bias voltage between the probe and the sample. A threshold level for the electrical current obtained by the AFM measurement is predetermined, and an existing region area ($S_1$) of the surface covered by the lubricant is measured by measuring the surface area which provides the electrical current of equal to or lower than the threshold level; and the ratio of the existing region area ($S_1$) to a measurement area ($S_2$), which is the entire area of the lubricating layer surface applied with the voltage, gives a covering ratio:

$(S_1/S_2) \times 100$.

More specifically, an electrical current for a predetermined surface area ($S_2$) of the lubricating layer is precedently obtained via the conductance mode of the AFM, and the threshold level is set to be the obtained current, then the surface area ($S_1$) of a portion providing the electrical current of equal to or lower than the threshold level is also determined, and the covering ratio is obtained by using the above equation. It was found that the portion of the surface that is not included in $S_1$ provides larger electrical current than the threshold level, and therefore it is considered that the portion includes a region that is not covered by the lubricant, and also considered that the state of the region is a sea island state of the lubricant. Conversely, a region providing an electrical current equal to or lower than the threshold level is considered to be substantially covered by the lubricant. Accordingly, the covering ratio is a measure for indicating a state of forming the lubricating layer, i.e., distribution of the lubricant, and in particular a measure for indicating whether the lubricant is in a state of being uniformly applied or in a sea island state. The inventors of the present invention have found that the measurement of the covering ratio presents a determination of the sea island state of the lubricant that has not been able to determined by using ESCA.

The available range of the predetermined surface area ($S_2$) is normally selected from a range of $3 \times 3$ μm to $30 \times 30$ μm, and larger area or smaller area than this range may be employed. However, smaller area than this range may not give the state of the entire surface since the measurement result corresponds to too localized region, and larger area than $30 \times 30$ μm may require much duration time for the measurement. Nevertheless, the measurement results in each of the both cases would not considerably vary, and therefore the results in both cases will converge.

The covering ratio for the above-indicated range of the area can be maintained to an appropriate level by employing a solvent mixture for applying the lubricating layer including at least three solvents that helps dispersing the self-agglomerating material. Each of at least three solvents includes at least one selected from respective one of the following three groups (1)–(3):

(1) ketone solvents having a boiling point of 40–130° C., for example, acetone, methyl ethyl ketone (MEK), methyl isobutyl ketone (MIBK) and the like;

(2) aliphatic hydrocarbon solvents having 4 carbons–10 carbons, for example, hexane, heptane, octane, nonane, decane and the like; and (3) alcoholic solvents having equal or less than 6 carbons, for example, methanol, ethanol, propanol, butanol, and isomers thereof.

At least one solvent selected from respective one of the above three groups may be one solvent or a plurality of solvents, and the mixture ratio of the solvents selected from the respective three groups is preferably: (1) the ketone solvents 5–20% wt.; (2) the aliphatic hydrocarbon solvents 10–40% wt.; and (3) the alcoholic solvents 40–80% wt. Using a solvent having a mixture ratio of out of this range may cause a problem in which it is difficult to prevent the self agglomeration of the lubricant to obtain a desired covering ratio. In particular, excessive amount of (1) the ketone solvents causes a considerable degree of the sea island state, thereby causing unstable tracking stability; and excessive amount of (2) the aliphatic hydrocarbon solvents and/or (3) the alcoholic solvents adversely affect the solubility, thereby being impossible to apply the lubricant, and in addition presenting micelle state that is sea island state in a microscopic scale. A primary function of (1) the ketone solvents is to dissolve the lubricants, a role of (2) the aliphatic hydrocarbon solvents is to stabilize the condition of the solvents, and (3) the alcoholic solvents functions maintaining the applicability thereof.

The lubricant for forming the lubricating layer may not be limited to a particular lubricant provided that the covering ratio on the lubricating layer is within the above-indicated range by using the lubricant. More preferably, the lubricating layer is formed by applying the solution that is prepared by dissolving the lubricant of a compound having fluorine atom into the solvent mixture of solvents selected from the above-indicated three groups. The lubricant of the compound having fluorine atom has a primary chemical structure of $R_1$—A—$R_2$. Here, $R_1$, A and $R_2$ are:

$R_1$: $CF_3(CF_2)_n$—, $CF_3(CF_2)_n(CH2)_m$—, $CH_3(CH_2)_p$—, H;

A: —COO—, —O—, —COOCH($C_pH_{2p+1}$)$CH_2$COO—; and $R_2$: $CF_3(CF_2)_n$—, $CF_3(CF_2)_n(CH_2)_m$—, $CH_3(CH_2)_p$—, H.

where $R_1$ and $R_2$ are different, and preferably n=7–17, m=1–3, and p=7–30. In addition, $R_1$ and/or $R_2$ of straight chain type may provide improved lubricating effect. The compound having "n" of smaller than 7 may provide reduced water repellency, but "n" of greater than 17 may cause a blocking phenomenon with the nonmagnetic support base or the back coated layer, thereby failing the reduction of friction. Similar tendency to "n" is observed for varying "p". In addition, two or more of such types of lubricants can be mixed to be used.

Also, in order to obtain a stable covering ratio within the above-indicated range, it is preferable to control the conditions for the drying process during the formation of the lubricating layer. The detail of the drying process is that, after applying the lubricant solution onto the protective layer, the coated protective layer passes through the drying furnace, where the solvent is sufficiently evaporated. The conditions for operating the drying furnace is not particularly limited, but the furnace may preferably be operated so that the coated protective layer passes though the furnace of for example 70–110° C. within 5–15 seconds.

The nonmagnetic base may not be particularly limited to a particular material provided that the base can withstand for the drying process, and may include films of, for example: polyethylene terephthalate (PET); polyethylene naphthalate (PEN); polyimides; aramids; poly ether ether ketone (PEEK); poly sulphon and the like. The thickness of the film may be selected to be suitable for the specific application of the magnetic recording medium, and an example is that the thickness of the magnetic recording medium for video tapes is selected by the recording time and the properties required by the system, and normally 5–40 $\mu$m.

The magnetic materials of the metal magnetic layer may be selected from pure metals such as Co, Fe and so on, or metal alloys such as Co—Ni, Co—Fe, Co—Ni—Fe, Co—Cr, Co—Cu, Co—Ni—Cr, Co—Pt, Co—Pt—Cr, Co—Cr—Ta, Co—Ni—B, Co—Ni—Fe, Co—Fe—B, Co—Ni—Fe—B and so on. In particular, it is more preferable to use Co or Co alloys, in view of improving electromagnetic conversion characteristics. In general, such magnetic material is directly deposited onto the nonmagnetic base, or after Ni has been deposited onto the nonmagnetic base such magnetic material is deposited thereon, to form the magnetic layer. Prior to performing the deposition of the magnetic material, the deposition chamber is evacuated to about $10^{-6}$ Torr, and the deposition is performed by melting the magnetic material by using an electron gun, and once the melting is completed, the nonmagnetic base is fed to the main roller so that the base runs along the main roller, and the deposition is carried out on the main roller. In this case, an oxidizing gas selected from oxygen, ozone and dinitrogen monoxide may be introduced toward the magnetic layer for the purpose of controlling the magnetic characteristics thereof.

The protective layer is provided for the purpose of preventing corrosion of the metal magnetic layer and so on, and the available materials for the protective layer includes hard carbon film, SiO film, $SiO_x$ film and so on, and the hard carbon film is preferable material. The hard carbon film can be produced via vacuum deposition method, sputtering method, plasma CVD (chemical vapor deposition) method and so on, SiO film can be produced via vacuum deposition method, and $SiO_x$ film can be produced via plasma CVD method. In particular, the hard carbon film is preferably produced via plasma CVD method, and so produced film has improved abrasion resistance.

A back coated layer can be disposed on a surface of the nonmagnetic base that is opposite to the surface on which the above indicated metal magnetic layer, the protective layer and the lubricating layer are disposed. The back coated layer is formed by applying a back coat material that includes a binder resin and an inorganic compound and/or carbon black mixed and dispersed within an organic solvent onto the surface of the base opposite to the magnetic layer side. The formulation of the back coat material is not limited to a specific formulation provided that each of the raw materials for the back coat material is available to this type of magnetic recording medium. For example, the binder material may include poly vinyl chloride containing copolymer, polyurethane resins, acrylic resins, epoxy resins, phenoxy resins, polyester resins and so on, and depending on the characteristics of the medium and the process conditions, a single resin selected from these resins or a mixture of some of these resins can be employed. The carbon black may include furnace carbon black, thermal carbon black and so on. The inorganic compounds may include, for example, calcium carbonate, alumina, α-iron oxide and so on. The particle size of these materials may be selected to provide properties required for the medium such as electrical resistance, friction properties and so on to a suitable levels. The organic solvent may include, for example, ketones, aromatic hydrocarbons and so on, and be suitably selected in considering the solubility of the binder resins.

EXAMPLES

The present invention will be fully described in referring the preferred embodiments as follows.

Examples 1–3 and Comparative Examples 1–4

A metal magnetic layer was formed by depositing two layers of 100% Co on a nonmagnetic base of polyethylene naphthalate (PEN) having a thickness of 6 $\mu$m via the deposition method while introducing oxygen. The deposited two layers have thickness of 1000 angstrom/1000 angstrom, $\phi$m =75 mA (7.5 memu/cm$^2$) and a coercive force: Hc=119.4 kA/m (1500 Oe). A hard carbon film (diamond like carbon film: DLC) was formed thereon via the plasma CVD method. On the other hand, a back coated layer having a formulation shown below was deposited on a surface of the base opposite to the metal magnetic layer via the application method so that the resultant back coated layer (BC layer) has a thickness of 0.4 $\mu$m after completing the drying process, thereby completing a base sample. The base sample was coated with a lubricant including compounds containing fluorine atom having a formula of the following:

HOOCCH($C_{14}H_{29}$)$CH_2$COOCH$_2$CH$_2$($CF_2$)$_7$CF$_3$; and

CH$_3$($C_{16}H_{32}$)COOCH$_2$CH$_2$($CF_2$)$_7$CF$_3$.

The amounts of these compounds were adjusted to be the same weight for both and to provide the concentration listed in the table shown below. The lubricant was applied with each of solvents prepared for respective EXAMPLES, and the coated base was dried in the drying furnace at 90° C.

| Formulation of the back coated layer application solvent | |
|---|---|
| carbon black (particle size: 80 nm) | 10 parts by weight; |
| carbon black (particle size: 20 nm) | 40 parts by weight; |
| calcium carbonate (particle size: 70 nm) | 50 parts by weight; |
| nitro cellulose(Nc) (Asahi Chemical, BTH1/2S) | 40 parts by weight; |
| polyurethane resin (Toyobo, UR-6300) | 60 parts by weight; |
| methylethyl ketone | 800 parts by weight; |
| toluene | 640 parts by weight; |
| cyclohexane | 160 parts by weight; |
| poly isocyanate, solid content 50% (Nippon Polyurethane Industry, COLONATE L) | 40 parts by weight. |

Measurements by Using AFM

Each of the base samples 1 having, in turn, the metal magnetic layer 4, the hard carbon layer (protective layer) 5 and the lubricating layer 6 on one surface of the nonmagnetic base 3 and also having the back coated layer 2 on the other surface thereof was cut to the dimension of 5 mm×5 mm, and the base sample 1 was set to be mounted on the sample stage 8 of the AFM so as to contact the back coated layer 2 with the sample stage 8. The cut portion of the sample 1 was coated with an electrically conductive coating material dotite 7 so that the coated portion was conductive with the stage 8, as shown in FIG. 1.

After the "contact mode" was selected, a cantilever having a probe at the head was scanned and while a voltage of 1–4 volts was applied from the cantilever to the sample 1, and the electrical current was measured and recorded. As shown in FIG. 1, cantilever was scanned in the transverse direction, and simultaneously the sample stage 8 reciprocated along the longitudinal direction. The range of the surface for the measurement ($S_2$) was set to 5 μm×5 μm. The load of the cantilever to the sample was set to 10 mN, and the scanning speed was set to 5 μm/sec. The cantilever used in this case was a Si probe coated with CoPt. The threshold level was set to 0 A. The data of the obtained current was used for the calculation via the relationship: ($S_1/S_2$)×100, and thus the covering ratio was calculated.

Measurements of the Friction Coefficient

The respective samples were mounted to pins made of SUS 303 having a dimension of 2 mm φ and 0.2 S with the mounting angle of 90 degree, and the one edge of the sample was loaded at 0.1 N, and another edge was fixed to a tension meter. The sample was moved at a predetermined and constant speed, and the load measured by the tension meter was recorded to obtain the friction coefficient. In the tables shown below, "static friction" means the value at a moment of start moving, and "dynamic friction" means the value during moving. The coefficient was calculated by using $\mu=1/\pi Ln(T_2/T_1)$; (π: mounted angle, $T_1$: load, $T_2$: measured value).

Evaluation of the Durability

The durability of each of samples were evaluated to give the following reference index to respective samples by implementing the repeated friction coefficient measurements in the conditions identical to the above mentioned friction coefficient measurements. The number of the repeated trial was set to 1000 reciprocating movements. ○: substantially no tendency to augment was observed, and thus no problem; Δ: tendency to augment was observed; and ×: considerable tendency to augment was observed and thus considered to be impossible to use, or a sticking phenomenon was occurred and the measurement was stopped.

These results are shown in the following Table 1:

TABLE 1

| | mixing ratio of the solvent* (% wt.) | | | covering ratio (%) | dynamic friction coefficient | durability | static friction coefficient | concentration (% wt.) |
|---|---|---|---|---|---|---|---|---|
| | (1) | (2) | (3) | | | | | |
| Comparative Example 1 | 10 | 20 | 70 | 55 | 0.21 | X | 0.21 | 0.08 |
| Comparative Example 2 | 10 | 20 | 70 | 60 | 0.20 | Δ | 0.20 | 0.10 |
| Example 1 | 10 | 20 | 70 | 65 | 0.20 | ○ | 0.20 | 0.12 |
| Example 2 | 10 | 20 | 70 | 70 | 0.20 | ○ | 0.20 | 0.16 |
| Example 3 | 10 | 20 | 70 | 75 | 0.20 | ○ | 0.21 | 0.20 |
| Comparative Example 3 | 10 | 20 | 70 | 80 | 0.21 | Δ | 0.24 | 0.25 |
| Comparative Example 4 | 10 | 20 | 70 | 85 | 0.22 | X | 0.25 | 0.35 |

*(1) methylethyl ketone, (2) hexane, (3) ethanol.

Examples 4–10 and Comparative Examples 5–12

Similarly, respective samples were prepared in a similar way except that the mixing ratio of the solvents was changed for each of examples although the types of the solvents were not changed, and that the concentration was 0.16%. In these examples, the measurements additionally include an observation of the surface in order to evaluate the state of the lubricant distributed onto the surface. The surface observations were carried out by using an optical microscope with 100-magnification. The indicator for the result of the evaluation on the observation was as follows. ○: no problem; and ×: a separation of the lubricant was observed.

These results are shown in the following Table 2:

TABLE 2

|  | mixing ratio of the solvent* (% wt.) (1)/(2)/(3) | covering ratio (%) | static friction coefficient | durability | surface observation |
|---|---|---|---|---|---|
| Comparative Example 5 | 2/5/93 | 58 | 0.22 | X | ○ |
| Comparative Example 6 | 2/18/80 | 57 | 0.22 | X | ○ |
| Comparative Example 7 | 5/10/85 | 60 | 0.21 | X | ○ |
| Comparative Example 8 | 10/5/85 | 63 | 0.20 | Δ | ○ |
| Example 4 | 5/15/80 | 65 | 0.20 | ○ | ○ |
| Example 5 | 5/40/55 | 67 | 0.20 | ○ | ○ |
| Example 6 | 10/10/80 | 68 | 0.20 | ○ | ○ |
| Example 7 | 10/20/70 | 70 | 0.20 | ○ | ○ |
| Example 8 | 10/30/60 | 69 | 0.20 | ○ | ○ |
| Example 9 | 20/10/70 | 75 | 0.21 | ○ | ○ |
| Example 10 | 20/40/40 | 73 | 0.20 | ○ | ○ |
| Comparative Example 9 | 20/5/75 | 61 | 0.21 | X | ○ |
| Comparative Example 10 | 20/45/35 | 79 | 0.23 | Δ | X |
| Comparative Example 11 | 25/10/65 | 59 | 0.21 | X | ○ |
| Comparative Example 12 | 30/50/20 | 82 | 0.25 | X | X |

*(1) methylethyl ketone, (2) hexane, (3) ethanol.

As described above, the present invention provides magnetic recording mediums based on the metal thin film type magnetic recording medium having improved tracking stability and friction stability, by improving the lubricating layer in consideration of the state of forming the lubricating layer in view of the distribution of the lubricant.

Although the present invention has been described in considerable detail with regard to certain preferred versions thereof, other versions are possible. Therefore, the appended claims should not be limited to the description of the preferred versions contained therein.

What is claimed is:

1. A magnetic recording medium at least having, in turn, a metal magnetic layer, a protective layer and a lubricating layer on one surface of a nonmagnetic base, wherein covering ratio of a surface of said lubricating layer with a lubricant is 65–75%, wherein the lubricant has the chemical structure: $R_1$—A—$R_2$, wherein $R_1$ and $R_2$ are different, and each is $CF_3(CF_2)_n-$, $CF_3(CF_2)_n(CH_2)_m$—, $CH_3(CH_2)_p$—, or H; A is —COO—, —O—, or —COOCH($C_pH_{2p-1}$)$CH_2COO$—; n is 7–17, m is 1–3, and is 7–30.

2. The magnetic recording medium according to claim 1, wherein said lubricating layer is formed by applying said lubricant in a mixture of solvents containing at least three solvents selected from three groups, said at least three solvents includes at least one from group (1): ketone solvents having a boiling point of 40–130° C.; at least one from group (2): aliphatic hydrocarbon solvents having 4 carbons–10 carbons; and at least one from group (3): alcoholic solvents having equal to or less than 6 carbons.

3. The magnetic recording medium according to claim 2, wherein a mixing ratio of said at least three solvents selected from each of said three groups is: group (1) ketone solvents 5–20% wt.; group (2) aliphatic hydrocarbon solvents 10–40% wt.; and group (3) alcoholic solvents 40–80% wt.

4. The magnetic recording medium according to claim 3, wherein said protective layer includes hard carbon film.

5. The magnetic recording medium according to claim 2, wherein said protective layer includes hard carbon film.

6. The magnetic recording medium according to claim 1, wherein said protective layer includes hard carbon film.

7. The magnetic recording medium according to claim 1, wherein the lubricant has one of the following formulae: $HOOCCH(C_{14}H_{29})CH_2COOCH_2CH_2(CF_2)_7CF_3$ and $CH_3(C_{16}H_{32})COOCH_2CH_2(CF_2)_7CF_3$.

* * * * *